(12) United States Patent
Yagi et al.

(10) Patent No.: US 11,104,603 B2
(45) Date of Patent: Aug. 31, 2021

(54) CRYSTALLIZED GLASS SUBSTRATE

(71) Applicant: OHARA INC., Kanagawa (JP)

(72) Inventors: Toshitaka Yagi, Kanagawa (JP); Yutaka Yamashita, Kanagawa (JP); Naoyuki Goto, Kanagawa (JP)

(73) Assignee: OHARA INC., Kanagawa (JP)

( * ) Notice: Subject to any disclaimer, the term of this patent is extended or adjusted under 35 U.S.C. 154(b) by 0 days.

(21) Appl. No.: 16/626,727

(22) PCT Filed: Apr. 10, 2018

(86) PCT No.: PCT/JP2018/015069
§ 371 (c)(1),
(2) Date: Dec. 26, 2019

(87) PCT Pub. No.: WO2019/003565
PCT Pub. Date: Jan. 3, 2019

(65) Prior Publication Data
US 2020/0131079 A1    Apr. 30, 2020

(30) Foreign Application Priority Data

Jun. 26, 2017 (JP) .............................. JP2017-123974
Jan. 26, 2018 (JP) .............................. JP2018-011021

(51) Int. Cl.
| | |
|---|---|
| *C03C 3/085* | (2006.01) |
| *C03C 3/087* | (2006.01) |
| *C03C 10/00* | (2006.01) |
| *C03C 4/18* | (2006.01) |
| *C03C 21/00* | (2006.01) |

(52) U.S. Cl.
CPC ............ *C03C 10/0018* (2013.01); *C03C 4/18* (2013.01); *C03C 21/002* (2013.01); *C03C 2204/00* (2013.01)

(58) Field of Classification Search
CPC ..... C03C 10/0018; C03C 4/18; C03C 21/002; C03C 2204/00; C03C 3/085; C03C 3/087
See application file for complete search history.

(56) References Cited

U.S. PATENT DOCUMENTS

| | | | | |
|---|---|---|---|---|
| 2014/0134397 | A1* | 5/2014 | Amin | C03C 3/093 |
| | | | | 428/141 |
| 2016/0102010 | A1* | 4/2016 | Beall | C03C 4/02 |
| | | | | 428/410 |
| 2016/0236970 | A1* | 8/2016 | Beall | C03C 4/18 |

FOREIGN PATENT DOCUMENTS

| | | |
|---|---|---|
| JP | 2006062929 A | 3/2006 |
| JP | 2014040353 A | 3/2014 |
| JP | 2014114200 A | 6/2014 |
| JP | 2017001937 A | 1/2017 |
| JP | 2017014066 A | 1/2017 |
| WO | WO 2012124758 A | 9/2012 |
| WO | WO 2017094329 A1 | 6/2017 |

OTHER PUBLICATIONS

WIPO, International Search Report dated Jun. 18, 2018.

* cited by examiner

*Primary Examiner* — Joanna Pleszczynska
(74) *Attorney, Agent, or Firm* — Li & Cai Intellectual Property (USA) Office

(57) ABSTRACT

To provide a crystallized glass substrate that is hard and resistant to fracture and that is also resistant to shattering upon breakage.
A crystallized glass substrate includes a crystallized glass serving as a base material and a compressive stress layer forming a surface thereof. The crystallized glass contains, in % by weight on an oxide basis, 40.0% to 70.0% of a $SiO_2$ component, 11.0% to 25.0% of an $Al_2O_3$ component, 5.0% to 19.0% of a $Na_2O$ component, 0% to 9.0% of a $K_2O$ component, 1.0% to 18.0% of one or more selected from a MgO component and a ZnO component, 0% to 3.0% of a CaO component, and 0.5% to 12.0% of a $TiO_2$ component. The $SiO_2$ component, the $Al_2O_3$ component, the $Na_2O$ component, the one or more selected from the MgO component and the ZnO component, and the $TiO_2$ component are present in a total amount of 90% or more. The compressive stress layer has a depth of layer of 40 μm or more. The compressive stress layer has a surface compressive stress of 750 MPa or more. The compressive stress layer has a central tension of 65 MPa or less as determined by curve analysis.

12 Claims, No Drawings

CRYSTALLIZED GLASS SUBSTRATE

FIELD OF THE DISCLOSURE

The present invention relates to a crystallized glass substrate having a compressive stress layer forming a surface thereof.

BACKGROUND OF THE DISCLOSURE

Cover glasses for protecting displays are used in portable electronic devices such as smartphones and tablet PCs. In addition, protectors for protecting lenses are used in in-vehicle optical devices. Furthermore, such materials have recently been desired in applications such as casings forming the exteriors of electronic devices. To allow such devices to withstand more severe use, there has been a growing need for a material with a higher hardness.

Chemically strengthened glasses are conventionally used as materials in applications such as protective members. However, conventional chemically strengthened glasses have a problem in that they are very susceptible to fracture perpendicular to the glass surface and thus often suffer accidental breakage upon dropping of the portable devices. Furthermore, there is a risk of injury from shattered and flying glass upon breakage. It is desired that a glass form large broken pieces upon breakage.

PTL 1 discloses a crystallized glass substrate for information recording media. This crystallized glass substrate exhibits an insufficient compressive stress value after chemical strengthening.

CITATION LIST

Patent Literature

PTL 1: Japanese Unexamined Patent Application Publication No. 2014-114200

SUMMARY OF THE DISCLOSURE

The present invention has been made in view of the foregoing problem. An object of the present invention is to provide a crystallized glass substrate that is hard and resistant to fracture and that is also resistant to shattering upon breakage.

After conducting intensive research in order to solve the foregoing problem, the inventors have found that a crystallized glass substrate that has high impact resistance and that is also resistant to shattering into small pieces (explosive breakage) upon breakage due to impact can be obtained by performing chemical strengthening with an acid mixture to increase the surface compressive stress in the compressive stress layer while maintaining the central tension at a low level, thereby completing the present invention. Specifically, the present invention provides the following.
(Configuration 1)

A crystallized glass substrate including a crystallized glass serving as a base material and a compressive stress layer forming a surface thereof, the crystallized glass containing, in % by weight on an oxide basis:
40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component,
the $SiO_2$ component, the $Al_2O_3$ component, the $Na_2O$ component, one or more selected from the MgO component and the ZnO component, and the $TiO_2$ component being present in a total amount of 90% or more,
wherein the compressive stress layer has a depth of layer of 40 μm or more, the compressive stress layer has a surface compressive stress of 750 MPa or more, and
the compressive stress layer has a central tension of 65 MPa or less as determined by curve analysis.
(Configuration 2)

The crystallized glass substrate according to Configuration 1, wherein the surface compressive stress is 900 MPa or more.
(Configuration 3)

The crystallized glass substrate according to Configuration 1 or 2, wherein the crystallized glass substrate has a thickness of 0.05 to 2.0 mm.
(Configuration 4)

The crystallized glass substrate according to any one of Configurations 1 to 3, wherein the crystallized glass base material contains, in % by weight on an oxide basis:
45.0% to 65.0% of the $SiO_2$ component;
13.0% to 23.0% of the $Al_2O_3$ component;
8.0% to 16.0% of the $Na_2O$ component;
0% to 7.0% of the $K_2O$ component;
2.0% to 15.0% of the one or more selected from the MgO component and the ZnO component;
0% to 2.0% of the CaO component; and
1.0% to 10.0% of the $TiO_2$ component,
the $SiO_2$ component, the $Al_2O_3$ component, the $Na_2O$ component, the one or more selected from the MgO component and the ZnO component, and the $TiO_2$ component being present in a total amount of 90% or more.

Advantageous Effects of Invention

According to the present invention, a crystallized glass substrate that is hard and resistant to fracture and that is also resistant to shattering upon breakage can be provided.

The crystallized glass substrate of the present invention can be used as a material for optical lenses. Because of its appearance unique to glass-based materials, the crystallized glass substrate of the present invention can also be used for outer frame members of portable electronic devices and other decorative purposes.

DETAILED DESCRIPTION OF THE EXEMPLARY EMBODIMENTS

Embodiments and examples of the crystallized glass substrate of the present invention will hereinafter be described in detail. The following embodiments and examples are not intended to limit the invention in any way. Rather, the invention can be practiced with suitable modifications within the scope of purpose of the invention.

[Crystallized Glass Substrate]

The crystallized glass substrate of the present invention includes a crystallized glass having a predetermined composition and serving as a base material (also referred to as "crystallized glass base material") and a compressive stress layer forming a surface thereof. The compressive stress layer can be formed by subjecting the crystallized glass base material to ion exchange treatment and strengthens the crystallized glass base material.

The depth of layer of the compressive stress layer is 40 µm or more, for example, 50 µm or more, or may be 60 µm or more. The upper limit may be, for example, 300 µm or less, 200 µm or less, or 100 µm or less. If the compressive stress layer has such a thickness, the propagation of a deep crack formed in the crystallized glass substrate and the fracture of the substrate due to the crack can be inhibited.

The surface compressive stress in the compressive stress layer is 750 MPa or more, preferably 900 MPa or more, more preferably 950 MPa or more. The upper limit may be, for example, 1,300 MPa or less, 1,200 MPa or less, or 1,100 MPa or less. If the compressive stress layer has such a compressive stress value, the propagation of a crack can be inhibited, thus improving the mechanical strength.

The central tension in the compressive stress layer is 65 MPa or less, preferably 60 MPa or less, more preferably 55 MPa or less. The lower limit may be, for example, 30 MPa or more, 35 MPa or more, or 40 MPa or more. The central tension value can be determined by curve analysis.

The central tension value becomes higher as the surface compressive stress becomes larger and the depth of layer becomes larger. Whereas the surface hardness and the Vickers hardness tend to increase as the surface compressive stress and the depth of layer become larger, the central tension also increases. An excessive central tension results in a large stress inside the material. As the central tension becomes larger, the substrate is more likely to break so as to shatter into small pieces (break into small pieces and fly) upon breakage. Whereas a smaller central tension is preferred to inhibit fracture upon breakage, the hardness does not increase unless the surface compressive stress and the depth of layer are large. According to the present invention, chemical strengthening is performed by immersion in a molten salt of a mixture or combination of potassium and sodium salts to increase the surface compressive stress while maintaining the central tension at a low level. This is followed by immersion in a molten salt of a potassium salt alone, which can further increase the surface compressive stress relative to the central tension while maintaining the central tension at a low level. As a result, the crystallized glass substrate is hard and resistant to fracture, and explosive breakage can also be inhibited upon fracture.

The thickness of the crystallized glass substrate is typically, but not limited to, 0.05 to 2.0 mm.

The depth of layer of the compressive stress layer is preferably 5% or more, more preferably 8% to 20%, of the thickness of the crystallized glass substrate.

The crystallized glass base material is a material having a crystal phase and a glass phase and is distinguished from amorphous solids. In general, a crystal phase in a crystallized glass is identified using the angle of a peak appearing in an X-ray diffraction graph obtained by X-ray diffraction, optionally in combination with TEM/EDX.

The crystallized glass contains, as the crystal phase, for example, one or more selected from $MgAl_2O_4$, $MgTi_2O_5$, $Mg_2TiO_4$, $Mg_2SiO_4$, $MgAl_2Si_2O_8$, and $Mg_2Al_4Si_5O_{18}$.

The average crystal size of the crystallized glass is, for example, 4 to 15 nm, or may be 5 to 13 nm or 6 to 10 nm. A crystallized glass having a smaller average crystal size is easier to smoothly polish to a surface roughness Ra on the order of several Å and also has a higher transmittance.

The compositional ranges of the individual components forming the crystallized glass will be described below. In the present specification, the amounts of the individual components present are all expressed in % by weight on an oxide basis unless otherwise specified. Here, "on an oxide basis" means that, if it is assumed that the components forming the crystallized glass are all decomposed and changed into oxides, the amounts of the oxides of the individual components present in the crystallized glass are expressed in % by weight, with the total weight of the oxides being 100% by weight.

The crystallized glass serving as the base material (hereinafter also simply referred to as "crystallized glass") preferably contains, in % by weight on an oxide basis:

40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

More preferably, the $SiO_2$ component is present in an amount of 45.0% to 65.0%, further preferably 50.0% to 60.0%.

More preferably, the $Al_2O_3$ component is present in an amount of 13.0% to 23.0%.

More preferably, the $Na_2O$ component is present in an amount of 8.0% to 16.0%. The $Na_2O$ component may be present in an amount of 9.0% or more, or 10.5% or more.

More preferably, the $K_2O$ component is present in an amount of 0.1% to 7.0%, further preferably 1.0% to 5.0%.

More preferably, one or more selected from the MgO component and the ZnO component are present in an amount of 2.0% to 15.0%, further preferably 3.0% to 13.0%, particularly preferably 5.0% to 11.0%. One or more selected from the MgO component and the ZnO component may be the MgO component alone, the ZnO component alone, or both, preferably the MgO component alone.

More preferably, the CaO component is present in an amount of 0.01% to 3.0%, further preferably 0.1% to 2.0%.

More preferably, the $TiO_2$ component is present in an amount of 1.0% to 10.0%, further preferably 2.0% to 8.0%.

The crystallized glass may contain 0.01% to 3.0% (preferably 0.1% to 2.0%, further preferably 0.1% to 1.0%) of one or more selected from a $Sb_2O_3$ component, a $SnO_2$ component, and a $CeO_2$ component.

The above amounts added may be selected in any suitable combination.

The $SiO_2$ component, the $Al_2O_3$ component, the $Na_2O$ component, one or more selected from the MgO component and the ZnO component, and the $TiO_2$ component may be present in a total amount of 90% or more, preferably 95% or more, more preferably 98% or more, further preferably 98.5% or more.

The $SiO_2$ component, the $Al_2O_3$ component, the $Na_2O$ component, the $K_2O$ component, one or more selected from the MgO component and the ZnO component, the CaO component, the $TiO_2$ component, and one or more selected from the $Sb_2O_3$ component, the $SnO_2$ component, and the $CeO_2$ component may be present in a total amount of 90% or more, preferably 95% or more, more preferably 98% or more, further preferably 99% or more. These components may account for 100%.

The crystallized glass may or may not contain a $ZrO_2$ component provided that it does not interfere with the advantages of the present invention. The $ZrO_2$ component may be added in an amount of 0% to 5.0%, 0% to 3.0%, or 0% to 2.0%.

The crystallized glass may or may not contain a $B_2O_3$ component, a $P_2O_5$ component, a BaO component, an FeO component, a $SnO_2$ component, a $Li_2O$ component, a SrO component, a $La_2O_3$ component, an $Y_2O_3$ component, a $Nb_2O_5$ component, a $Ta_2O_5$ component, a $WO_3$ component, a $TeO_2$ component, and a $Bi_2O_3$ component provided that they do not interfere with the advantages of the present invention. These components may each be added in an amount of 0% to 2.0%, 0% to less than 2.0%, or 0% to 1.0%.

In addition to the $Sb_2O_3$ component, the $SnO_2$ component, and the $CeO_2$ component, the crystallized glass of the present invention may contain, as clarifiers, an $As_2O_3$ component and one or more selected from the group consisting of F, Cl, NOx, and SOx. However, the amount of clarifier present is preferably up to 5.0%, more preferably up to 2.0%, most preferably up to 1.0%.

The crystallized glass serving as the base material preferably contains, in mole % on an oxide basis:
 43.0 mole % to 73.0 mole % of the $SiO_2$ component,
 4.0 mole % to 18.0 mole % of the $Al_2O_3$ component,
 5.0 mole % to 19.0 mole % of the $Na_2O$ component,
 0 mole % to 9.0 mole % of the $K_2O$ component,
 2.0 mole % to 22.0 mole % of one or more selected from the MgO component and the ZnO component,
 0 mole % to 3.0 mole % of the CaO component, and
 0.5 mole % to 11.0 mole % of the $TiO_2$ component.

The $SiO_2$ component, the $Al_2O_3$ component, the $Na_2O$ component, one or more selected from the MgO component and the ZnO component, and the $TiO_2$ component may be present in a total amount of 90 mole % or more, preferably 95 mole % or more, more preferably 98 mole % or more, further preferably 99 mole % or more.

The value of the molar ratio [$Al_2O_3$/MgO] expressed on an oxide basis may be 0.5 to 2.0.

The value of the molar ratio [$TiO_2$/$Na_2O$] expressed on an oxide basis may be 0 to 0.41.

The value of the molar ratio [MgO/$Na_2O$] expressed on an oxide basis may be 0 to 1.60.

Optionally, other components not described above may be added to the crystallized glass of the present invention provided that they do not interfere with the properties of the crystallized glass of the present invention. For example, the glass may be colored provided that it does not interfere with the properties of the crystallized glass.

Furthermore, the crystallized glass of the present invention is preferably substantially free of Pb, Th, Tl, Os, Be, and Se because there has recently been a trend to reduce the use of these components as harmful chemical substances.

[Method of Manufacture]

The crystallized glass of the present invention can be produced by the following method. Specifically, raw materials are uniformly mixed together such that the above components are present in amounts within predetermined ranges and are melted and molded to manufacture a raw glass. This raw glass is then crystallized to produce a crystallized glass base material. The crystallized glass base material is then chemically strengthened.

The raw glass is heat-treated to uniformly precipitate crystals inside the glass. This heat treatment may be performed at one or two temperatures.

Two-step heat treatment involves performing a nucleation step by heat treatment at a first temperature and, after the nucleation step, performing a crystal growth step by heat treatment at a second temperature higher than that in the nucleation step.

One-step heat treatment involves continuously performing a nucleation step and a crystal growth step at one temperature. Typically, the raw glass is heated to a predetermined heat treatment temperature and, upon reaching the heat treatment temperature, is held at that temperature for a predetermined period of time, followed by cooling.

The first temperature in the two-step heat treatment is preferably 600° C. to 750° C. The holding time at the first temperature is preferably 30 minutes to 2,000 minutes, more preferably 180 minutes to 1,440 minutes.

The second temperature in the two-step heat treatment is preferably 650° C. to 850° C. The holding time at the second temperature is preferably 30 minutes to 600 minutes, more preferably 60 minutes to 300 minutes.

For the heat treatment at one temperature, the heat treatment temperature is preferably 600° C. to 800° C., more preferably 630° C. to 770° C. The holding time at the heat treatment temperature is preferably 30 minutes to 500 minutes, more preferably 60 minutes to 300 minutes.

A shaped article is produced from the crystallized glass base material, for example, by grinding and polishing. By machining the shaped article into a thin sheet, a thin sheet of crystallized glass base material can be produced.

Thereafter, in the present invention, a compressive stress layer is formed in the crystallized glass base material. The compressive stress layer is a strengthened layer formed through ion exchange by chemical strengthening.

Chemically strengthening the crystallized glass base material in a molten salt mixture of potassium and sodium salts (mixed bath) can provide a crystallized glass substrate having a large surface compressive stress relative to the central tension in the compressive stress layer formed therein. After chemical strengthening in the mixed bath, the crystallized glass base material is further chemically strengthened in a molten salt mixture of a potassium salt alone (simple bath) to further increase the surface compressive stress relative to the central tension. Specifically, for example, the crystallized glass base material is contacted with or immersed in a molten salt containing potassium or sodium, for example, a molten salt of a mixture or combination of salts such as potassium nitrate ($KNO_3$) and sodium nitrate ($NaNO_3$), that has been heated to 350° C. to 600° C. (preferably 380° C. to 570° C., more preferably 400° C. to 550° C.) for 90 minutes or more, for example, 200 minutes to 2,000 minutes, preferably 300 minutes to 1,000 minutes. The mixing ratio of the potassium salt to the sodium salt is, for example, by weight, 1:1 to 100:1, 2:1 to 90:1, 5:1 to 80:1, or 10:1 to 75:1. The crystallized glass base material is then preferably contacted with or immersed in a molten salt containing potassium, for example, a molten salt of potassium nitrate ($KNO_3$), that has been heated to 380° C. to 550° C. (more preferably 400° C. to 500° C.) for a short period of time, for example, 1 minute or more, 3 minutes to 40 minutes, 4 minutes to 30 minutes, or 5 minutes to 20 minutes. Such chemical strengthening allows ion exchange reactions to proceed between the components present near the surface and the components present in the molten salt. As a result, a compressive stress layer is formed in the surface portion.

EXAMPLES

Examples 1 to 14 and Comparative Examples 1 to 3

Raw materials, such as oxides, hydroxides, carbonates, nitrates, fluorides, chlorides, hydroxides, and metaphosphates, corresponding to the individual components of a crystallized glass were selected. These raw materials were weighed and uniformly mixed together so as to give the following composition.

(% by Weight on Oxide Basis)

55% of a $SiO_2$ component, 18% of an $Al_2O_3$ component, 12% of a $Na_2O$ component, 2% of a $K_2O$ component, 8% of a MgO component, 1% of a CaO component, 5% of a $TiO_2$ component, and 0.1% of a $Sb_2O_3$ component The raw material mixture was then charged and melted in a platinum crucible. Thereafter, the molten glass was homogenized by stirring and was cast into a mold, followed by gradual cooling to produce a raw glass.

The resulting raw glass was subjected to one-step heat treatment (650° C. to 730° C., 5 hours) for nucleation and crystallization to produce a crystallized glass serving as a base material. The resulting crystallized glass was analyzed with a 200 kV field-emission transmission electron microscope FE-TEM (JEM-2100F available from JEOL Ltd.). As a result, precipitated crystals with an average crystal size of 6 to 9 nm were observed.

Furthermore, a lattice image obtained by electron diffraction was examined, and EDX analysis was performed. As a result, $MgAl_2O_4$ and $MgTi_2O_4$ crystal phases were identified. The average crystal size was determined by determining the crystal sizes of crystal grains in an area of 180×180 $nm^2$ under a scanning electron microscope and then calculating the average thereof.

The resulting crystallized glass base material was cut and ground into a shape with a length of 140 mm, a width of 70 mm, and a thickness of more than 1.0 mm and was polished on the opposing sides thereof parallel to each other to form substrates with thicknesses of 0.8 mm and 0.65 mm. As for the transmittance of the crystallized glass base material, the 5% transmission wavelength at a thickness of 10 mm was 346 nm, and the 80% transmission wavelength at a thickness of 10 mm was 595 nm.

The crystallized glass base materials polished on the opposing sides thereof parallel to each other to the thicknesses shown in Table 1 were chemically strengthened under the conditions shown in Table 1 to obtain crystallized glass substrates. Specifically, the crystallized glass base materials of Examples 1, 2, 4, 6, 7, and 9 and Comparative Example 3 were immersed in molten salt mixtures of $KNO_3$ and $NaNO_3$ in the mixing ratios shown in Table 1 at the salt bath temperatures for the immersion times shown in Table 1. The crystallized glass base materials of Examples 3, 5, 8, 10, 11, 12, 13, and 14 were immersed in molten salt mixtures of $KNO_3$ and $NaNO_3$ in the mixing ratios shown in Table 1 at the salt bath temperatures for the immersion times shown in Table 1 and were then immersed in a molten salt of $KNO_3$ alone at the salt bath temperatures for the immersion times shown in Table 1. The crystallized glass base materials of Comparative Examples 1 and 2 were immersed in a molten salt of $KNO_3$ alone at the salt bath temperatures for the immersion times shown in Table 1.

The thickness (depth of layer) (DOL) and surface compressive stress value (CS) of the compressive stress layer of each crystallized glass substrate were measured with an FSM-6000LE glass surface stress meter available from Orihara Industrial Co., Ltd. They were calculated with the refractive index of the sample being 1.54 and the photoelastic constant of the sample being 29.658 [(nm/cm)/MPa]. The central tension value (CT) was determined by curve analysis. The results are shown in Table 1.

In addition, each crystallized glass substrate was subjected to a sandpaper drop test in the following manner. The sandpaper test simulates dropping onto asphalt.

Sandpaper with a roughness of #180 was placed on a marble table. Two pieces of commercially available double-sided tape (70 mm×10 mm, 0.09 mm thick) were attached to a casing having a length of 150 mm, a width of 73 mm, a thickness of 6 mm, and a weight of 135 g along the short sides thereof, and the crystallized glass substrate was fixed to the casing. The substrate was then dropped together with the casing from a height of 10 cm from the sandpaper. The substrate was attached to the casing so as to collide directly with the sandpaper. If the substrate was not broken after dropping, the height was increased by 10 cm, and the same test was continued until the substrate was broken. After breakage, the condition of broken pieces was observed.

The height at which fracture occurred was rated on the following scale. The results are shown in Table 1.
A: 1,000 times or more the thickness of the substrate
B: 400 to 700 times the thickness of the substrate
C: less than 400 times the thickness of the substrate Ten broken pieces were selected from larger broken pieces of the crystallized glass substrate after breakage, and the weight of each broken piece was measured. The volume of each broken piece was determined from the specific gravity of the substrate, i.e., 2.54, and was divided by the sheet thickness to determine the surface area. This surface area was used to rate the condition of the broken pieces on the following scale. The results are shown in Table 1.

A: four or more broken pieces with a surface area of 1 $cm^2$ or more, or one or more broken pieces with a surface area of 10 $cm^2$ or more
B: one to three broken pieces with a surface area of 1 $cm^2$ or more C: no broken piece with a surface area of 1 $cm^2$ or more (all broken pieces were small pieces with a surface area of less than 1 $cm^2$)

Table 1 demonstrates that the substrate of the present invention is hard and resistant to breakage and is also resistant to shattering into small pieces upon breakage.

TABLE 1

| | Sheet thickness (mm) | First $KNO_3$ $NaNO_3$ Ratio (by weight) | | Temperature (° C.) | Time (min) | Second $KNO_3$ alone Temperature (° C.) | Time (min) | CS (MPa) | CT (MPa) | DOL (μm) | Height at which fracture occurred | Condition of broken pieces |
|---|---|---|---|---|---|---|---|---|---|---|---|---|
| Comparative Example 1 | 0.8 | K alone | — | 480 | 500 | | | 1,043 | 79 | 83 | A | C |
| Example 1 | 0.8 | 70 | 1 | 450 | 500 | | | 910 | 52 | 65 | B | B |
| Example 2 | 0.8 | 40 | 1 | 460 | 660 | | | 832 | 43 | 70 | B | B |
| Example 3 | 0.8 | 40 | 1 | 460 | 500 | 450 | 15 | 1,025 | 49 | 71 | A | A |
| Example 4 | 0.8 | 30 | 1 | 460 | 660 | | | 790 | 41 | 72 | B | A |
| Example 5 | 0.8 | 30 | 1 | 460 | 500 | 450 | 30 | 1,010 | 54 | 74 | A | A |
| Comparative Example 2 | 0.65 | K alone | — | 450 | 500 | | | 1,112 | 69 | 59 | A | C |
| Example 6 | 0.65 | 70 | 1 | 450 | 500 | | | 903 | 61 | 63 | B | B |

TABLE 1-continued

| | | First | | | | Second | | | | | Height at | |
| | Sheet | KNO₃ | NaNO₃ | | | KNO₃ alone | | | | | which | Condition |
| | thickness (mm) | Ratio (by weight) | | Temperature (° C.) | Time (min) | Temperature (° C.) | Time (min) | CS (MPa) | CT (MPa) | DOL (μm) | fracture occurred | of broken pieces |
|---|---|---|---|---|---|---|---|---|---|---|---|---|
| Example 7 | 0.65 | 30 | 1 | 460 | 500 | | | 785 | 52 | 58 | B | B |
| Example 8 | 0.65 | 30 | 1 | 460 | 500 | 450 | 15 | 1,053 | 58 | 59 | A | B |
| Example 9 | 0.65 | 25 | 1 | 460 | 500 | | | 760 | 56 | 65 | B | B |
| Example 10 | 0.65 | 25 | 1 | 460 | 500 | 450 | 15 | 1,022 | 58 | 66 | A | B |
| Example 11 | 0.65 | 25 | 1 | 460 | 500 | 450 | 5 | 970 | 50 | 66 | A | A |
| Comparative Example 3 | 0.65 | 10 | 1 | 460 | 660 | | | 562 | 45 | 75 | C | A |
| Example 12 | 0.65 | 10 | 1 | 460 | 660 | 450 | 15 | 935 | 46 | 72 | A | A |
| Example 13 | 0.8 | 3 | 1 | 510 | 500 | 450 | 15 | 1,008 | 40 | 97 | A | A |
| Example 14 | 0.55 | 3 | 1 | 500 | 500 | 450 | 15 | 985 | 51 | 84 | A | A |

What is claimed is:

1. A crystallized glass substrate comprising a crystallized glass serving as a base material and a compressive stress layer forming a surface thereof, the crystallized glass containing, in % by weight on an oxide basis:
   40.0% to 70.0% of a $SiO_2$ component;
   11.0% to 25.0% of an $Al_2O_3$ component;
   5.0% to 19.0% of a $Na_2O$ component;
   0% to 9.0% of a $K_2O$ component;
   1.0% to 18.0% of one or more selected from a MgO component and a ZnO component;
   0% to 2.0% of a $Li_2O$ component;
   0% to 3.0% of a CaO component; and
   0.5% to 12.0% of a $TiO_2$ component,
   the $SiO_2$ component, the $Al_2O_3$ component, the $Na_2O$ component, the one or more selected from the MgO component and the ZnO component, and the $TiO_2$ component being present in a total amount of 90% or more,
   wherein the compressive stress layer has a depth of layer of 40 μm or more,
   the compressive stress layer has a surface compressive stress of 750 MPa or more, and
   the compressive stress layer has a central tension of 65 MPa or less as determined by curve analysis.

2. The crystallized glass substrate according to claim 1, wherein the surface compressive stress is 900 MPa or more.

3. The crystallized glass substrate according to claim 1, wherein the crystallized glass substrate has a thickness of 0.05 to 2.0 mm.

4. The crystallized glass substrate according to claim 1, wherein the crystallized glass base material contains, in % by weight on an oxide basis:
   45.0% to 65.0% of the $SiO_2$ component;
   13.0% to 23.0% of the $Al_2O_3$ component;
   8.0% to 16.0% of the $Na_2O$ component;
   0% to 7.0% of the $K_2O$ component;
   2.0% to 15.0% of the one or more selected from the MgO component and the ZnO component;
   0% to 2.0% of the CaO component; and
   1.0% to 10.0% of the $TiO_2$ component,
   the $SiO_2$ component, the $Al_2O_3$ component, the $Na_2O$ component, the one or more selected from the MgO component and the ZnO component, and the $TiO_2$ component being present in a total amount of 90% or more.

5. The crystallized glass substrate according to claim 1, wherein the compressive stress layer has a depth of layer of 50 μm or more, the compressive stress layer has a surface compressive stress of 935 MPa or more, and the compressive stress layer has a central tension of 60 MPa or less as determined by curve analysis.

6. The crystallized glass substrate according to claim 1, wherein the compressive stress layer has a depth of layer of 50 μm or more, the compressive stress layer has a surface compressive stress of 935 MPa or more, and the compressive stress layer has a central tension of 55 MPa or less as determined by curve analysis.

7. The crystallized glass substrate according to claim 1, wherein the compressive stress layer has a depth of layer of 60 μm or more, the compressive stress layer has a surface compressive stress of 935 MPa or more, and the compressive stress layer has a central tension of 60 MPa or less as determined by curve analysis.

8. The crystallized glass substrate according to claim 1, wherein the compressive stress layer has a depth of layer of 60 μm or more, the compressive stress layer has a surface compressive stress of 950 MPa or more, and the compressive stress layer has a central tension of 55 MPa or less as determined by curve analysis.

9. The crystallized glass substrate according to claim 1, wherein the crystallized glass base material contains, in % by weight on an oxide basis: 10.5% to 16.0% of the $Na_2O$ component.

10. A crystallized glass substrate comprising a crystallized glass serving as a base material and a compressive stress layer forming a surface thereof, the crystallized glass containing, in % by weight on an oxide basis:
   40.0% to 70.0% of a $SiO_2$ component;
   11.0% to 25.0% of an $Al_2O_3$ component;
   8.0% to 19.0% of a $Na_2O$ component;
   0% to 9.0% of a $K_2O$ component;
   1.0% to 18.0% of one or more selected from a MgO component and a ZnO component;
   0.01% to 3.0% of a CaO component; and
   0.5% to 12.0% of a $TiO_2$ component,
   the $SiO_2$ component, the $Al_2O_3$ component, the $Na_2O$ component, the one or more selected from the MgO component and the ZnO component, and the $TiO_2$ component being present in a total amount of 90% or more,
   wherein the compressive stress layer has a depth of layer of 40 μm or more,
   the compressive stress layer has a surface compressive stress of 750 MPa or more, and
   the compressive stress layer has a central tension of 65 MPa or less as determined by curve analysis.

11. The crystallized glass substrate according to claim 10, wherein the crystallized glass base material contains, in % by weight on an oxide basis:
- 45.0% to 65.0% of the $SiO_2$ component;
- 13.0% to 23.0% of the $Al_2O_3$ component;
- 8.0% to 16.0% of the $Na_2O$ component;
- 0.1% to 7.0% of the $K_2O$ component;
- 2.0% to 15.0% of the one or more selected from the MgO component and the ZnO component;
- 0.01% to 3.0% of the CaO component; and
- 1.0% to 10.0% of the $TiO_2$ component,
- the $SiO_2$ component, the $Al_2O_3$ component, the $Na_2O$ component, the one or more selected from the MgO component and the ZnO component, and the $TiO_2$ component being present in a total amount of 90% or more.

12. The crystallized glass substrate according to claim 10, wherein the crystallized glass base material contains, in % by weight on an oxide basis:
- 50.0% to 60.0% of the $SiO_2$ component;
- 13.0% to 23.0% of the $Al_2O_3$ component;
- 9.0% to 16.0% of the $Na_2O$ component;
- 1.0% to 5.0% of the $K_2O$ component;
- 3.0% to 13.0% of the one or more selected from the MgO component and the ZnO component;
- 0.1% to 2.0% of the CaO component; and
- 2.0% to 8.0% of the $TiO_2$ component,
- the $SiO_2$ component, the $Al_2O_3$ component, the $Na_2O$ component, the one or more selected from the MgO component and the ZnO component, and the $TiO_2$ component being present in a total amount of 90% or more.

\* \* \* \* \*

(12) EX PARTE REEXAMINATION CERTIFICATE (12250th)
United States Patent
Yagi et al.

(10) Number: US 11,104,603 C1
(45) Certificate Issued: Mar. 23, 2023

(54) CRYSTALLIZED GLASS SUBSTRATE

(71) Applicant: OHARA INC., Kanagawa (JP)

(72) Inventors: Toshitaka Yagi, Kanagawa (JP); Yutaka Yamashita, Kanagawa (JP); Naoyuki Goto, Kanagawa (JP)

(73) Assignee: OHARA INC., Sagamihara (JP)

Reexamination Request:
No. 90/015,042, Jun. 3, 2022

Reexamination Certificate for:
Patent No.: 11,104,603
Issued: Aug. 31, 2021
Appl. No.: 16/626,727
PCT Filed: Apr. 10, 2018
PCT No.: PCT/JP2018/015069
§ 371 (c)(1),
(2) Date: Dec. 26, 2019
PCT Pub. No.: WO2019/003565
PCT Pub. Date: Jan. 3, 2019

(51) Int. Cl.
*C03C 10/00* (2006.01)
*C03C 4/18* (2006.01)
*C03C 21/00* (2006.01)
*C03C 3/085* (2006.01)
*C03C 3/087* (2006.01)

(52) U.S. Cl.
CPC ............ *C03C 10/0018* (2013.01); *C03C 4/18* (2013.01); *C03C 21/002* (2013.01); *C03C 2204/00* (2013.01)

(58) Field of Classification Search
None
See application file for complete search history.

(56) References Cited

To view the complete listing of prior art documents cited during the proceeding for Reexamination Control Number 90/015,042, please refer to the USPTO's Patent Electronic System.

*Primary Examiner* — Sean E Vincent

(57) ABSTRACT

To provide a crystallized glass substrate that is hard and resistant to fracture and that is also resistant to shattering upon breakage.
A crystallized glass substrate includes a crystallized glass serving as a base material and a compressive stress layer forming a surface thereof. The crystallized glass contains, in % by weight on an oxide basis, 40.0% to 70.0% of a $SiO_2$ component, 11.0% to 25.0% of an $Al_2O_3$ component, 5.0% to 19.0% of a $Na_2O$ component, 0% to 9.0% of a $K_2O$ component, 1.0% to 18.0% of one or more selected from a MgO component and a ZnO component, 0% to 3.0% of a CaO component, and 0.5% to 12.0% of a $TiO_2$ component. The $SiO_2$ component, the $Al_2O_3$ component, the $Na_2O$ component, the one or more selected from the MgO component and the ZnO component, and the $TiO_2$ component are present in a total amount of 90% or more. The compressive stress layer has a depth of layer of 40 μm or more. The compressive stress layer has a surface compressive stress of 750 MPa or more. The compressive stress layer has a central tension of 65 MPa or less as determined by curve analysis.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-9, 11 and 12, dependent on an amended claim, are determined to be patentable.

New claims 13-16 are added and determined to be patentable.

1. A crystallized glass substrate comprising a crystallized glass serving as a base material and a compressive stress layer forming a surface thereof, the crystallized glass containing, in % by weight on an oxide basis:
   40.0% to 70.0% of a $SiO_2$ component;
   11.0% to 25.0% of an $Al_2O_3$ component;
   5.0% to 19.0% of a $Na_2O$ component;
   0% to 9.0% of a $K_2O$ component;
   1.0% to 18.0% of one or more selected from a MgO component and a ZnO component;
   0% to 2.0% of a $Li_2O$ component;
   0% to 3.0% of a CaO component; and
   0.5% to 12.0% of a $TiO_2$ component,
   the $SiO_2$ component, the $Al_2O_3$ component, the $Na_2O$ component, the one or more selected from the MgO component and the ZnO component, and the $TiO_2$ component being present in a total amount of 90% or more,
   *wherein the crystallized glass contains one or more selected from the group consisting of $MgAl_2O_4$, $MgTi_2O_5$, $Mg_2TiO_4$, $Mg_2SiO_4$, $MgAl_2Si_2O_8$, and $Mg_2Al_4Si_5O_{18}$ as the crystal phase;*
   wherein the compressive stress layer has a depth of layer of 40 μm or more,
   the compressive stress layer has a surface compressive stress of 750 MPa or more, and
   the compressive stress layer has a central tension of 65 MPa or less as determined by curve analysis.

10. A crystallized glass substrate comprising a crystallized glass serving as a base material and a compressive stress layer forming a surface thereof, the crystallized glass containing, in % by weight on an oxide basis:
    40.0% to 70.0% of a $SiO_2$ component;
    11.0% to 25.0% of an $Al_2O_3$ component;
    8.0% to 19.0% of a $Na_2O$ component;
    0% to 9.0% of a $K_2O$ component;
    1.0% to 18.0% of one or more selected from a MgO component and a ZnO component;
    0.01% to 3.0% of a CaO component; and
    0.5% to 12.0% of a $TiO_2$ component,
    the $SiO_2$ component, the $Al_2O_3$ component, the $Na_2O$ component, the one or more selected from the MgO component and the ZnO component, and the $TiO_2$ component being present in a total amount of 90% or more,
    *wherein the crystallized glass contains one or more selected from the group consisting of $MgAl_2O_4$, $MgTi_2O_5$, $Mg_2TiO_4$, $Mg_2SiO_4$, $MgAl_2Si_2O_8$, and $Mg_2Al_4Si_5O_{18}$ as the crystal phase;*
    wherein the compressive stress layer has a depth of layer of 40 μm or more,
    the compressive stress layer has a surface compressive stress of 750 MPa or more, and
    the compressive stress layer has a central tension of 65 MPa or less as determined by curve analysis.

13. *The crystallized glass substrate according to claim 1, wherein the crystallized glass base material contains, in % by weight on an oxide basis: 0% to 2.0% of a $P_2O_5$ component.*

14. *The crystallized glass substrate according to claim 10, wherein the crystallized glass base material contains, in % by weight on an oxide basis: 0% to 2.0% of a $P_2O_5$ component.*

15. *A crystallized glass substrate comprising a crystallized glass serving as a base material and a compressive stress layer forming a surface thereof, the crystallized glass containing, in % by weight on an oxide basis:*
    *40.0% to 70.0% of a $SiO_2$ component;*
    *11.0% to 25.0% of an $Al_2O_3$ component;*
    *5.0% to 19.0% of a $Na_2O$ component;*
    *0% to 9.0% of a $K_2O$ component;*
    *1.0% to 18.0% of one or more selected from a MgO component and a ZnO component;*
    *0% to 2.0% of a $Li_2O$ component;*
    *0% to 3.0% of a CaO component; and*
    *0.5% to 12.0% of a $TiO_2$ component,*
    *0% to 2.0% of a $P_2O_5$ component,*
    *the $SiO_2$ component, the $Al_2O_3$ component, the $Na_2O$ component, the one or more selected from the MgO component and the ZnO component, and the $TiO_2$ component being present in a total amount of 90% or more,*
    *wherein the compressive stress layer has a depth of layer of 40 μm or more,*
    *the compressive stress layer has a surface compressive stress of 750 MPa or more, and*
    *the compressive stress layer has a central tension of 65 MPa or less as determined by curve analysis.*

16. *A crystallized glass substrate comprising a crystallized glass serving as a base material and a compressive stress layer forming a surface thereof, the crystallized glass containing, in % by weight on an oxide basis:*
    *40.0% to 70.0% of a $SiO_2$ component;*
    *11.0% to 25.0% of an $Al_2O_3$ component;*
    *8.0% to 19.0% of a $Na_2O$ component;*
    *0% to 9.0% of a $K_2O$ component;*
    *1.0% to 18.0% of one or more selected from a MgO component and a ZnO component;*
    *0.01% to 3.0% of a CaO component; and*
    *0.5% to 12.0% of a $TiO_2$ component,*
    *0% to 2.0% of a $P_2O_5$ component,*
    *the $SiO_2$ component, the $Al_2O_3$ component, the $Na_2O$ component, the one or more selected from the MgO component and the ZnO component, and the $TiO_2$ component being present in a total amount of 90% or more,*
    *wherein the compressive stress layer has a depth of layer of 40 μm or more,*
    *the compressive stress layer has a surface compressive stress of 750 MPa or more, and*

*the compressive stress layer has a central tension of 65 MPa or less as determined by curve analysis.*

\* \* \* \* \*